United States Patent
Ehinger

(10) Patent No.: US 10,138,004 B2
(45) Date of Patent: Nov. 27, 2018

(54) FLYWHEEL DEVICE FOR POSITION STABILIZATION OF A SPACECRAFT

(71) Applicant: Rockwell Collins Deutschland GmbH, Heidelberg (DE)

(72) Inventor: Markus Ehinger, Weinheim (DE)

(73) Assignee: Rockwell Collins Deutschland GmbH, Heidelberg (DE)

( * ) Notice: Subject to any disclaimer, the term of this patent is extended or adjusted under 35 U.S.C. 154(b) by 0 days.

(21) Appl. No.: 15/757,176

(22) PCT Filed: Jul. 15, 2016

(86) PCT No.: PCT/EP2016/066911
§ 371 (c)(1),
(2) Date: Mar. 2, 2018

(87) PCT Pub. No.: WO2017/036654
PCT Pub. Date: Mar. 9, 2017

(65) Prior Publication Data
US 2018/0257793 A1 Sep. 13, 2018

(30) Foreign Application Priority Data
Sep. 4, 2015 (DE) .................. 10 2015 114 819

(51) Int. Cl.
*B64G 1/28* (2006.01)
*F16C 33/66* (2006.01)

(52) U.S. Cl.
CPC ............ *B64G 1/283* (2013.01); *B64G 1/285* (2013.01); *F16C 33/6603* (2013.01); *F16C 2326/47* (2013.01)

(58) Field of Classification Search
CPC ........ B64G 1/283; B64G 1/285; B64G 1/286; F16C 2326/47
See application file for complete search history.

(56) References Cited

U.S. PATENT DOCUMENTS

| | | | |
|---|---|---|---|
| 4,193,646 A | 3/1980 | Röckl et al. | |
| 4,285,553 A | 8/1981 | Robinson | |
| 5,214,981 A | 6/1993 | Weinberger et al. | |
| 6,019,319 A | 2/2000 | Falbel | |
| 6,069,429 A * | 5/2000 | Yamamoto ............ | F16C 17/107 310/67 R |

FOREIGN PATENT DOCUMENTS

| | | |
|---|---|---|
| DE | 2652846 A1 | 5/1978 |
| DE | 2842205 A1 | 4/1980 |
| DE | 3921765 A1 | 1/1991 |
| DE | 19509799 A1 | 9/1996 |
| DE | 69214152 T2 | 2/1997 |
| DE | 202005015431 U1 | 3/2006 |
| GB | 1216597 A | 12/1970 |

* cited by examiner

*Primary Examiner* — Nicholas McFall
(74) *Attorney, Agent, or Firm* — Murphy, Bilak & Homiller, PLLC

(57) ABSTRACT

The invention relates to a flywheel device for position stabilization of a spacecraft, comprising a carrier (1), a rotor (2), a magnetic drive (4) for the rotatingly driving the rotor (2) relative to the carrier (1), and a roller bearing (3) arranged between the rotor (2) and the carrier (1). A magnetic force can be generated between the rotor (2) and the carrier (1) by means of the magnetic drive (4) in order to pre-stress the rolling bearing (3). The outer diameter (A) of the rotor (2) can have, for example, only a maximum of 2.5 times of the rolling bearing diameter (W).

16 Claims, 1 Drawing Sheet

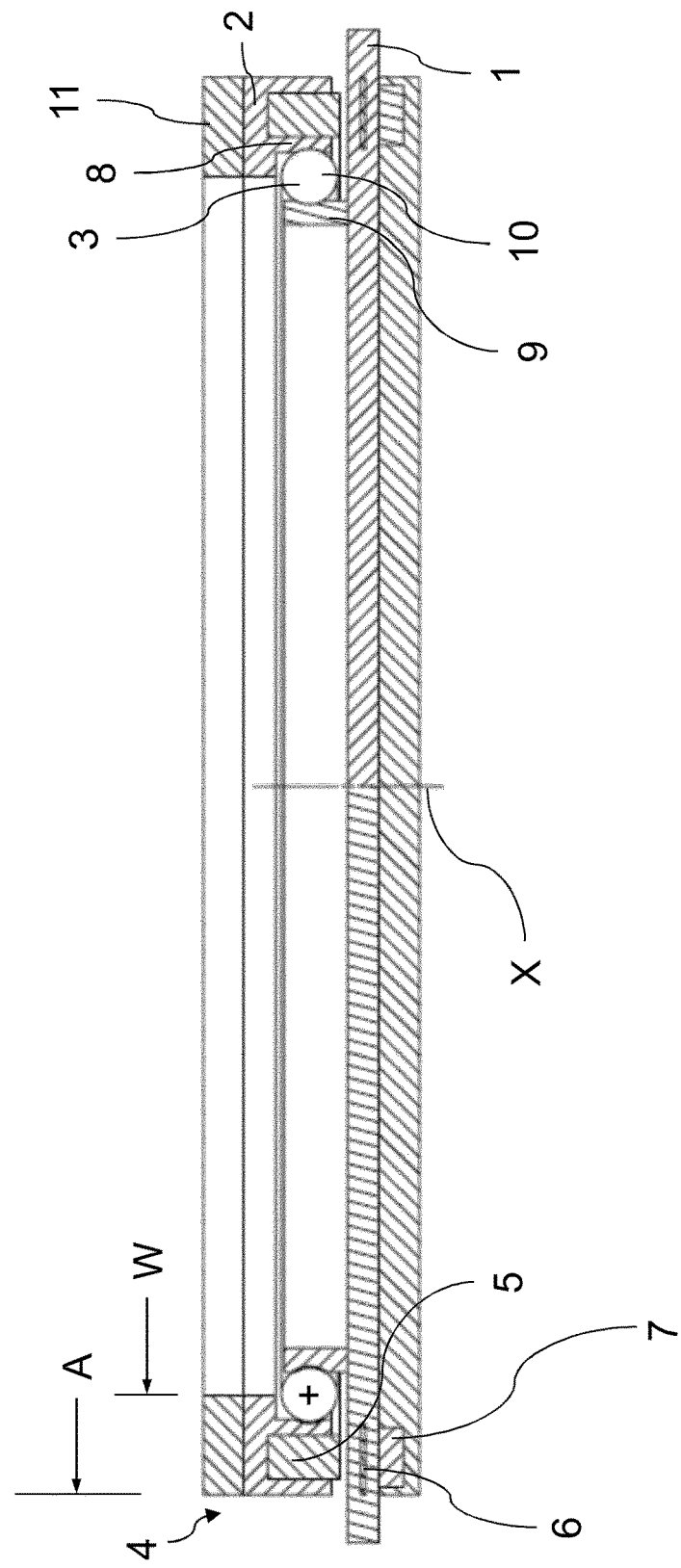

FLYWHEEL DEVICE FOR POSITION STABILIZATION OF A SPACECRAFT

The invention concerns a flywheel device for position stabilization of a spacecraft, in particular for position control of satellites.

Such flywheel devices or balance wheels are known. Rotation of the flywheel is started by a drive such that by the gyroscopic effect the stabilizing effect can be achieved. In order to achieve an effect gyroscopic effect it is appropriate to position a part of the mass of the flywheel that is as large as possible as much outwards as possible such that this mass can rotate with a diameter as large as possible around the rotational axis of the flywheel.

From DE 39 21 765 A1 such a flywheel is known that—similarly to the wheel of a bicycle—has a stator arrange at an inner position and an rotor arranged at an outside position, and a hub that carries the rotor rotatably on the stator by means of spokes. The hub is rotatably supported on the stator by two roller bearings.

Such flywheels that are also called reaction wheels have proven their worth for position control of satellites over decades. The support of the rotor is here typically carried out by means of at least two roller bearings that are formed as a fixed bearing and a loose bearing.

The present invention is concerned with the problem how to provide a flywheel device that has a simpler design than the known flywheel devices and that has reduced manufacturing costs.

According to the present invention this problem is solved by a flywheel device having the features of claim 1. Advantageous embodiments are indicated in the dependent claims.

A flywheel device for position stabilization of a spacecraft comprises a carrier, a rotor, a magnetic drive for rotatingly driving the rotor relative to the carrier, and a roller bearing arranged between the rotor and the carrier. Here, a magnetic force can be generated between the rotor and the carrier by means of the magnetic drive in order to pre-stress the roller bearing. The outer diameter of the rotor is at maximum 2.5-times the roller bearing diameter.

Accordingly, the rotor is driven rotatingly on the carrier by means of the magnetic drive, due to which the desired gyroscopic stabilization effect is achieved. The rotor is supported rotatably relative to the carrier by means of the roller bearing.

However, if only one roller bearing is provided in this manner no statically determined support can be achieved.

The static determination is achieved in that the magnetic drive causes a magnetic force between the rotor and the carrier. This magnetic force is in particular an attractive force that attracts the rotor to the carrier. In this manner the roller bearing is pre-stressed.

Supporting the rotor on the carrier corresponds therefore in a certain manner to a combination of a mechanical bearing (roller bearing) with a magnetic bearing that is formed by the magnetic drive.

This design allows to form the roller bearing to be much larger than known from the prior art. While in the prior art the outer diameter of the rotor can be for example more than 5-times or even more than 10-times the roller bearing diameter, in the flywheel device described herein the outer diameter of the rotor and the roller bearing diameter approximate each other.

Here, the roller bearing diameter is the diameter of the circle along which the centers of mass of the rolling bodies move during rotation of the rotor. If the rolling bodies are for example balls, the roller bearing diameter will correspond to the diameter of the circle along which the centers of the balls move. For other rolling bodies according relations apply.

Depending on the specific embodiment the rotor may be formed such that the outer diameter of the rotor can be chosen from the group of at maximum 2-times the roller bearing diameter, at maximum 1.5-times the roller bearing diameter, at maximum 1.3-times the roller bearing diameter, at maximum 1.2-times the roller bearing diameter. Depending on the embodiment, the outer diameter may therefore be at maximum 2-times, or at maximum 1.5-times, or at maximum 1.3-times, or at maximum 1.2-times, or at maximum 1-times the roller bearing diameter.

The smaller the ratio between the outer diameter of the rotor and the roller bearing diameter is, the more the roller bearing is arranged outwards in comparison to the rotor. As will be detailed below in this manner it may be possible to form the rotor even by the outermost bearing ring of the roller bearing. Then, the ratio between outer diameter of the rotor and the roller bearing diameter is small, for example only about 1.17 or less than 1.2.

The ratio may even be smaller and be e.g. less than 1.0, e.g. 0.9. Then, the outer diameter of the rotor is the same or smaller than the roller bearing diameter such that the roller bearing is arranged in comparison to the rotor rather outside. The drive may then e.g. be arranged within the inner ring of the roller bearing.

The magnetic drive may comprise a magnetic ring that is arranged at the rotor and comprises several magnetic poles, as well as magnetic circuit closing means arranged at the carrier opposite to the magnetic ring, and magnetic coils arranged at the carrier between the magnetic ring and the magnetic circuit closing means. The magnetic drive may thus be formed in a known manner and may cause the rotor to rotate relative to the carrier in the manner of a circularly arranged linear motor.

The magnetic force acting between the rotor and the carrier may in particular be generated between the magnetic ring and the magnetic circuit closing means during an operation of the flywheel device. The necessary magnetic force is herein predetermined by the design of the roller bearing, in particular by the chosen or necessary pre-stressing of the bearing and has to be taken into account for the design of the magnetic drive. For an appropriate design and appliance of current to the magnetic drive, the desired pre-stressing of the bearing can be achieved and maintained. Additionally, the magnetically generated pre-stress may also be strengthened by an additional holding magnet as will be explained below.

As already indicated above it is possible to support the rotor by means of only one roller bearing on the carrier. In difference from the prior art, a second roller bearing is therefore not necessary for achieving a statically determined support.

Possibly, the precisely one roller bearing may also be realized by two rolling body circles (for example ball rings) that are arranged closely next to each other and act as a single bearing. This allows achieving an enhanced load bearing capacity of the roller bearing. Such roller bearings with two rolling body circles are available at well-known roller bearing manufacturers and are therefore known. They have a higher load rating, but are considered to be only a single roller bearing.

The roller bearing may be formed such as to carry radial forces and axial forces. Carrying axial forces is in particular appropriate for the reason that the magnetic drive on its side generates an axial force as pre-stress force for the roller bearing. This axial force has to be carried by the roller bearing—together with further forces as for example the gravitational force of the rotor.

Hence, an appropriate choice for the roller bearing may for example be an axial bearing, a spindle ball bearing or the like.

The axial forces have to be carried by the roller bearing only in one direction, if it is ensured that the pre-stress force generated by the magnetic drive is always sufficient to pre-stress the roller bearing. This guarantees that the roller bearing falls apart.

The rolling bodies of the roller bearing, such as for example balls, may be guided in a cage which can then at the same time also be used for re-greasing the bearing. Re-greasing may also be realized by a specific greasing system in which at least a part of the components are arranged on the rotating rotor or also in the open inner space surrounded by the rotor.

The roller bearing may also comprise a lower bearing ring that is arranged at the carrier and an upper bearing ring that is arranged at the rotor. The terms "lower bearing ring" and "upper bearing ring" are chosen here in an arbitrary manner in order to be able to distinguish the two bearing rings with regard to their assignment. Just the same, it would for example be possible to speak of a "first bearing ring" and a "second bearing ring". With regard to an orientation in space the expressions "lower" and "upper" have no meaning.

The upper bearing ring that is arranged at the rotor may according to one embodiment be the outer bearing ring, while the lower bearing ring forms then the inner bearing ring. Just the same, in a variant a reversed arrangement may be present in which the upper bearing ring corresponds to the inner bearing ring and the lower bearing ring to the outer bearing ring.

In particular the lower bearing ring that is arranged at the carrier may in a variant consist of a ceramic material in order to save weight, which might be of considerable importance regarding the planned use of the flywheel device.

The upper bearing ring may be formed integrally at the rotor. In particular, the upper bearing ring and the rotor may form only a single part such that the upper bearing ring is an integral part of the rotor. The upper bearing ring serves then also itself as flywheel mass or is directly integrated in a flywheel ring (the rotor). The bearing ring serves then as carrier for the magnetic poles.

The upper bearing ring is pressed by the magnetic motor forces into or against the lower bearing ring. The bearing can be rotated freely and is driven by the integrated motor. The magnetic drive replaces therefore a second roller bearing and simplifies in this manner the design which also reduces the costs.

By using only a single roller bearing also less operating noise is generated. Due to the compact design of the flywheel device the operating noise is also not enhanced by further resonances of the housing which is typically the case for flywheels according to the prior art. A complex pre-stressing of the roller bearing can therefore be omitted, as the pre-stressing of the bearing is adjustable via the magnetic drive. This simplifies also the assembly.

According to an embodiment the rotor may be provided with an additional mass. The rotor constitutes in this case one of the bearing rings of the roller bearing and carries—as detailed above—the magnetic ring belonging to the magnetic drive. The additional mass may be fixed to the rotor as separate additional element.

In particular, the additional mass may be formed as an additional mass ring arranged on the rotor.

Increasing the mass of the rotor allows generating stronger gyroscopic forces which allows an increased position stabilization of the spacecraft. This is in particular then appropriate, if the spacecraft is a larger satellite that has larger mass and hence larger inertia.

Providing the additional mass allows for example a modular design of the flywheel device. If an operation of the flywheel device for smaller, less heavy satellites is planned, possibly the rotor alone is sufficient to generate sufficiently strong stabilization forces. If an operation in a larger, heavier spacecraft is planned, the additional mass may be provided additionally.

The additional mass may due to its gravitational force for respective gravitational environments generate a force that acts oppositely to the magnetic force generated by the magnetic drive, and which causes therefore that the roller bearing is pulled apart or is separated. In this case it might be appropriate that at the rotor or on the carrier a holding magnet is arranged that acts between the rotor and the carrier and causes a magnetic holding force between the rotor and the carrier.

The holding magnet may for example be a holding magnet ring that is fixed at the rotor. The holding magnet ring may for example also be arranged inside of the rotor.

The holding force generated by the holding magnetic is an attractive force for holding together rotor and carrier, if the magnetic force of the magnetic drive is not sufficient to hold the heavy rotor that is possibly even additionally charged by the additional mass reliably on the carrier.

A greasing device for greasing the roller bearing may be provided. This may e.g. be a cage as already indicated above that simultaneously holds also the rolling bodies in their respective position. Just the same, it is possible that the greasing device is arranged on the rotating rotor or in the open inner space surrounded by the rotor, and that it serves as re-greasing system. In particular, the greasing device may be designed to act actively or passively.

For example it is possible for a passive greasing device that a lubricant such as oil or bearing grease, is provided due to the centrifugal forces during rotation of the rotor such as to grease the roller bearing. Just the same, capillary greasing is possible due to appropriate capillary means.

In an active greasing device a providing unit for the lubricant may be present. This may e.g. be a lubricant pump that uses e.g. also a piezo element that provides the lubricant like in an injection system.

These and further advantages and features will be explained in what follows with regard to an example by reference to the accompanying FIGURE. It shows FIG. 1 a section through a flywheel device.

FIG. 1 shows a sectional view of a flywheel device for position stabilization of a spacecraft as for example a satellite.

The flywheel device comprises a carrier 1 that carries a rotor 2 rotatably.

The carrier 1 should have sufficient stability and in particular torsional stiffness in order to be able to carry the rotor 2 reliably also for the forces acting during operation.

The rotor 2 is supported via a roller bearing 3 on the carrier 1. The rotor 2 constitutes the actual flywheel or balance wheel that rotates during operation with a high rotational frequency and generates due to this the desired gyroscopic forces for stabilization of the spacecraft.

The rotor 2 has an appropriate diameter, for example of up to 200 mm or even more. Due to the fact that the entire mass of the rotor 2 is arranged outwards, i.e. far from the middle axis X, the desired gyroscopic forces can be generated with high effectivity.

For a rotational drive of the rotor 2 relative to the carrier 1 a magnetic drive 4 is provided. The magnetic drive 4 comprises a magnetic ring 5 that is carried by the rotor 2 and that comprises an appropriate number of magnetic poles.

Further, the magnetic drive 4 comprises several magnetic coils 6 that are arranged in appropriate manner in or at the carrier 1 and that can be controlled by a control that is not illustrated.

Further, at the back of the carrier 1 magnetic circuit closing means 7 are provided also as part of the magnetic drive 4.

The magnetic drive 4 is in principle a magnetic linear motor that is arranged circularly. The control controls the magnetic coils 6 in appropriate manner such that they act together with the magnetic poles in the magnetic ring 5 and that they cause rotation of the rotor 2. The design of such a magnetic drive 4 is known so that a detailed description will be omitted here.

The control electronics and in particular further components (power electronics or the like) may for example be arranged on the carrier 1 in the space that is enclosed by the rotor 2 and—as can be seen in FIG. 1—open. This allows a very compact design of the flywheel device. In the space also components of a re-greasing system serving as a greasing device may be arranged, which comprises e.g. a piezo element for providing lubricant or the roller bearing 3.

The roller bearing 3 may for example be a grooved ball bearing as illustrated in FIG. 1. However, also other bearing types such as for example cylinder roller bearings, barrel type bearings or the like may be used. The roller bearing 3 comprises an outer bearing ring 8 (also called upper bearing ring) as well as an inner bearing ring 9 (also called lower bearing ring). Between the two bearing rings 8, 9 the rolling bodies are arranged, which are in the example illustrated in FIG. 1 balls 10.

The outer bearing ring 8 is an integral part of the rotor 2. Speaking differently, one could say that the rotor 2 of the example illustrated in FIG. 1 is formed by the bearing ring 8. For other examples not illustrated in FIG. 1 the outer bearing ring 8 may also be formed as a separate element that is fixed at the rotor 2.

For a proper operation of the roller bearing 3 an according and sufficient number of balls 10 has to be arranged equally distributed between the bearing rings 8, 9. In order to ensure an equal distance between the balls 10 around the circumference of the roller bearing, the balls 10 are held in known manner by a bearing cage that is not shown in FIG. 1. The bearing cage may not only be used for holding the balls in their respective positions, but may also be used to provide a lubricant in order to guarantee a long time greasing of the roller bearing 3. In particular for use of the flywheel device in a satellite typically lifetime lubrication is desired.

Greasing may also be realized e.g. due to centrifugal forces and e.g. by a not illustrated greasing device that is arranged on the rotating parts. Also, a greasing device may be provided in the open space in the inner part of the roller bearing 3, which uses e.g. capillary greasing or an active greasing system having lubricant providing means. The lubricant providing means may e.g. be a piezo injection element.

The rotor 2 and the roller bearing 3 are arranged rotationally symmetric around the middle axis X. The outer diameter A of the rotor 2 may here only be slightly larger than the roller bearing diameter W of the roller bearing 3.

The roller bearing diameter W is defined such that it corresponds to the diameter of the circle around which the centers of gravity of the rolling bodies (here: the balls 10) move.

The smaller the ratio between the outer diameter A of the rotor 2 and the roller bearing diameter W, the more efficient and compact the rotor 2 can be designed. For example, a ratio of maximally 1.5 has turned out in particular appropriate. In the exemplary flywheel device illustrated in FIG. 1 the ratio between the outer diameter A and their roller bearing diameter W is approximately 1.2.

As already explained the mechanical support of the rotor 2 on the carrier 1 is provided only by a single roller bearing 3. To prevent that the roller bearing 3 falls apart and to allow a statically determined support, a magnetic force between the rotor 2 and the carrier 1 (attractive force) is generated in addition by the magnetic drive 4. This magnetic force has to be dimensioned sufficiently large in order to prevent falling apart of the roller bearing 3.

In this manner the flywheel device can be operated reliable and stable.

In the example illustrated in FIG. 1 an additional mass having the form of an additional mass ring 11 is provided on the rotor 2. The additional mass ring 11 is arranged on the upper side of the rotor 2 and enhances the overall flywheel mass of the rotor 2.

Since the additional mass ring 11 constitutes a separate part with respect to the rotor 2 or the outer bearing ring 8, during manufacturing of the flywheel device it is possible in a simple manner to provide different additional masses by selecting different additional mass rings 11, in order to achieve different flywheel effects.

If, in particular in the case of a heavy additional mass provided by the additional mass ring 11, the mass of the entire rotor 2 is large, there will be the possibility that the magnetic holding force of the magnetic drive 4 is not sufficient to prevent a separation of the roller bearing 3. In this case it may be advantageous, if additionally a holding magnet, which is not illustrated in FIG. 1, is provided at the rotor 2 or at the carrier 1 in order to generate an additional magnetic holding force between the rotor 2 and the carrier 1. As the holding magnet ring does not comprise additional mechanically movable parts, it does not suffer from wearing. Moreover, it does not generate additional vibrations that could impair operation of the flywheel device.

The invention claimed is:

1. A flywheel device for position stabilization of a spacecraft, the flywheel device comprising:
   a carrier;
   a rotor;
   a magnetic drive configured to drive the rotor rotatingly relative to the carrier; and
   a roller bearing arranged between the rotor and the carrier,
   wherein the magnetic drive is configured to generate a magnetic force between the rotor and the carrier for pre-stressing the roller bearing,
   wherein an outer diameter of the rotor is at most 2.5 times a diameter of the roller bearing.

2. The flywheel device of claim 1, wherein the outer diameter of the rotor is at most 2 times the diameter of the roller bearing.

3. The flywheel device of claim 1, wherein the outer diameter of the rotor is at most 1.5 times the diameter of the roller bearing.

4. The flywheel device of claim 1, wherein the outer diameter of the rotor is at most 1.3 times the diameter of the roller bearing.

5. The flywheel device of claim 1, wherein the outer diameter of the rotor is at most 1.2 times the diameter of the roller bearing.

6. The flywheel device of claim 1, wherein the outer diameter of the rotor is at most 1.0 times the diameter of the roller bearing.

7. The flywheel device of claim 1, wherein the magnetic drive comprises:
- a magnetic ring arranged at the rotor and comprising magnetic poles;
- a magnetic circuit closing means arranged at the carrier opposite to the magnetic ring; and
- magnetic coils arranged at the carrier between the magnetic ring and the magnetic circuit closing means.

8. The flywheel device of claim 7, wherein during operation of the flywheel device the magnetic drive is configured to generate the magnetic force between the magnetic ring and the magnetic circuit closing means.

9. The flywheel device of claim 1, wherein precisely one roller bearing is arranged between the rotor and the carrier.

10. The flywheel device of claim 1, wherein the roller bearing is configured to carry radial forces and axial forces.

11. The flywheel device of claim 1, wherein the roller bearing comprises:
- a lower bearing ring arranged at the carrier; and
- an upper bearing ring arranged at the rotor.

12. The flywheel device of claim 11, wherein the upper bearing ring is formed integrally at the rotor.

13. The flywheel device of claim 1, further comprising an additional mass provided at the rotor.

14. The flywheel device of claim 13, wherein the additional mass is an additional mass ring arranged on the rotor.

15. The flywheel device of claim 1, further comprising a holding magnet arranged at the rotor or on the carrier and configured to act between the rotor and the carrier to generate a magnetic holding force between the rotor and the carrier.

16. The flywheel device of claim 1, further comprising a greasing device configured to grease the roller bearing.

* * * * *